United States Patent Office 3,542,691
Patented Nov. 24, 1970

3,542,691
ONE-STEP PROCESS FOR PREPARING A LIQUID N - ALKYL - N' - PHENYL - PARA - PHENYLENE-DIAMINE SYSTEM
William Budd, Cuyahoga Falls, and Albert H. Olzinger, Akron, Ohio, assignors to The Goodyear Tire & Rubber Company, Akron, Ohio, a corporation of Ohio
No Drawing. Filed May 8, 1968, Ser. No. 727,659
Int. Cl. C08f 45/60
U.S. Cl. 252—401
8 Claims

ABSTRACT OF THE DISCLOSURE

A one-step process for providing a liquid N-alkyl-N'-phenyl-para-phenylenediamine age resister system for polymers.

---

This invention relates to a process for preparing a liquid N - alkyl - N' - phenyl-para-phenylenediamine age resister system for polymers.

Many polymers, both vulcanized and unvulcanized, are subject to degradation by oxygen. Many vulcanized polymers are subject to degradation by ozone. Degradation by oxygen can take the form of chain scission and/or crosslinking of the polymers. Such degradation can result in polymers which are very difficult to process, and which possess inferior physical properties, such as reduced tensile and flexibility. Ozone attack, in particular, will often result in cracking of the vulcanized polymer, particularly when the vulcanized polymer is subjected to dynamic conditions. For example, polymers in the sidewall of a pneumatic tire are very susceptible to ozone cracking. In order to prevent the degradation of vulcanized and unvulcanized polymers it has been necessary in the past to incorporate various antioxidant and/or antiozonant compounds into the polymer environment. In many applications it is desirable that the age resister be in liquid form at room temperature. For example, where it is desired that the age resister be added to a polymer latex to protect the polymer against oxygen degradation during subsequent finishing steps, it is preferable that the age resister be a liquid so that it may be added to the latex in the form of an emulsion.

Also, where it is desirable to compound a polymer prior to vulcanization with an antiozonant, low melting solid antiozonant can offer the disadvantage of being caked or lumpy, due to exposure to temperatures approaching and/or exceeding their melting point during storage or shipping and are therefore difficult to handle. Liquid systems offers no such disadvantage.

N - 4 - methyl - 2 - pentyl-N'-phenyl-para-phenylenediamine (MPDA) and N-5-methyl-2-hexyl-N'-phenyl-para-phenylendiamine (MHDA) act both as antiozonants and as antioxidants. Although individually they are low melting solids at room temperature, certain mixtures of MPDA and MHDA can be made which are liquids at room temperature, i.e., a temperature of approximately 72° F. These antioxidant/antiozonant system therefore offer the advantages of liquid age resister systems. Such mixtures can be prepared by heating the components separately until both are liquids, combining the reactants to form a homogenous blend and cooling the combination to room temperature. Another method involves combining the materials, heating the combination until the combination is completely liquid and then cooling the combination to room temperature. Still another method involves preparing separate solutions of the components, combining the solutions and removing the solvent. Another method comprises dissolving both components in the same solvent and then removing the solvent.

All of these methods have certain disadvantages. The melt method and the solution method both require that the components be made separately. The former method requires that the materials be heated and then cooled. The latter method requires that the components be dissolved in a solvent and requires the removal of the solvent. All of these aforementioned steps are time consuming and expensive. Therefore it would be desirable to prepare such mixtures by a simple one step method.

It is an object of this invention to provide a simple process for preparing liquid mixtures of N-4-methyl-2-pentyl - N' - phenyl-para-phenylenediamine (MPDA) and N - 5 - methyl - 2 - hexyl - N'-phenyl-para-phenylenediamine (MHDA).

The objects of the present invention are accomplished by a process comprising reacting a mixture comprising (A) 4-methyl-2-pentanone (MP); (B) 5-methyl-2-hexanone (MH) and (C) at least one nitrogen containing compound selected from the group consisting of para-nitrodiphenylamine, para-aminodiphenylamine and para-nitrosodiphenylamine in the presence of hydrogen and a reductive alkylation catalyst system wherein the molar ratio of (A) to (B) is from about 30/70 to about 80/20. Where it is desirable that the age resister system not only be a liquid at room temperature, but in addition be liquid at much lower temperatures and/or after becoming solid at lower temperatures, be able to liquefy on returning the system to room temperature, MP/MH molar ratios of from about 60/40 to about 30/70 should be used. An effective and relatively inexpensive MP/MH molar ratio is from about 70/30 to about 58/42.

The product prepared by the above process offers both antioxidant and antiozonant properties and can be used as an age resister for vulcanized and unvulcanized polymers such as natural rubber and synthetic polymers subject to degradation such as cis-1,4 polyisoprene, cis-1,4 polybutadiene, butadiene/styrene elastomers and terpolymers of ethylene propylene and an unconjugated diene.

The reductive alkylation reaction is normally conducted at temperatures between 50° C. and 240° C. Since a reductive alkylation reaction employs hydrogen it is necessary to conduct the reaction under substantial pressure. Normal pressures employed generally range from 250 to 2000 pounds per square inch. In some cases the pressure may be substantially higher, e.g., in the range of 4000 to 5000 pounds per square inch.

In carrying out the process of the present invention one procedure that may be used is as follows. The nitrogen containing compound is charged into a suitable reactor with the ketones and a reductive alkylation catalyst as has been described earlier herein. The materials may be added individually or in any combination. The order of addition is not critical. The mixture is heated to a reaction temperature in the range of between 50° C. and 240° C. and hydrogen under pressure of from 250 to 2000 pounds per square inch is then introduced to the reaction vessel. The reaction is permitted to proceed for a period of time sufficient to obtain conversion of the reactants to the N-alkyl substituted amine. The pressure on the reaction vessel is then released, and the product is recovered by distilling off the volatile materials. This reductive alkylation may be carried out on either a batch or continuous basis.

The molar ratio of the ketone mixture to the nitrogen containing compound in the reaction mixture normally varies from about 1:1 to about 10:1, although higher ratios may be used.

At the higher molar ratios of the ketone mixture to the nitrogen containing compound the excess ketone mixture acts as a solvent for the reactants and the reaction product. For example, when a molar ratio of ketone to the nitrogen containing compound of form about 4/1 to about 5/1 and higher is used, the excess ketone acts as a solvent. The 4/1 to 5/1 ratio is desirable since the higher ratios act as a driving force for the reaction, while the excess ketone make the use of an additional solvent unnecessary. When the ratio is reduced to the point where the excess ketone no longer functions effectively as the solvent, an inert organic solvent such as cyclohexane may be used. Hydrocarbon solvents are preferred. Although the inert organic solvent may be saturated or unsaturated it should be noted that under the reaction conditions of the present process the unsaturated compounds tend to be wholly or partially hydrogenated to the saturated form. For example, although benzene may be charged as the solvent it is likely to be hydrogenated to become cyclohexene.

Any reductive alkylation or hydrogenation catalyst system can be used. Typical types are systems containing nickel and/or platinum. These systems can be promoted or modified if desired. Some of the nickel type systems which can be used are described in United States Pat. 3,366,684. Examples of platinum type systems which can be used are described in United States Pat. 3,336,386. Preferred are systems containing nickel or platinum. A particularly preferred system is one comprising a nickel catalyst, an acid and free sulfur or a sulfur containing compound.

The practice of this invention is further illustrated by the following examples which are not intended as limitations on the scope of the invention.

Examples 1 to 6 illustrate the in situ preparation of the age resister systems of the present invention.

EXAMPLE 1

The following materials were charged to an autoclave, the molar ratio of 4-methyl-2-pentanone (MP) to 5-methyl-2-hexanone (MH) being 65:35.

| Component: | Parts by weight |
|---|---|
| Para-aminodiphenylamine | 1340 |
| MP | 2366 |
| MH | 1452 |
| Girdler G-49-A nickel catalyst | 21.84 |
| Toluene sulfonic acid | 0.50 |
| Thiodipropionic acid | 0.85 |

The above system was brought up to a pressure of 1000 p.s.i. gauge, with hydrogen continuously being added to and recycled from the system, to supersaturate the liquid reaction mixture. The reaction temperature was raised to 185° C. and the mixture agitated at 600 r.p.m. and reacted over a period of 180 minutes. At the end of the reaction period the mixture was cooled to 100° C. and the reaction pressure vented off. The reaction mixture was run through a filter to remove the G-49-A catalyst and into a flashing still. The volatiles were distilled from the product at a pot temperature of 190° C. at 10 millimeters of mercury. The product was then cooled. A chromatographic analysis was run on a sample of the liquid product, the analysis data being listed in Table I below.

TABLE I

| Component: | Product analysis (weight percent) |
|---|---|
| Para-aminodiphenylamine | 0.1 |
| N-4-methyl-2-pentyl-N'-phenylpara-phenylenediamine (MPDA) | 46.1 |
| N-5-methyl-2-hexyl-N'-phenylpara-phenylenediamine (MHDA) | 48.0 |

EXAMPLES 2 TO 6

Runs similar to the one described in Example 1 were made using various molar ratios of 4-methyl-2-pentanone to 5-methyl-2-hexanone. The chromatographic analysis of the products are given below in Table II.

TABLE II

| | Ketone ratio charged, mol percent of MP/ mol percent of MH | Product analysis | |
|---|---|---|---|
| | | MPDA | MHDA |
| Example: | | | |
| 2 | 50/50 | 33.5 | 59.3 |
| 3 | 60/40 | 41.9 | 52.2 |
| 4 | 60/40 | 42.6 | 51.3 |
| 5 | 80/20 | 66.5 | 27.9 |
| 6 | 90/10 | 77.8 | 20.3 |

The products of Examples 2, 3, 4 and 5 were liquid or essentially liquid at room temperature (about 72° F.). The product of Example 6 was a soft solid.

The data of Table II reveals that the mol percent of 5-methyl-2-hexanone charged is approximately directly proportional to the amount of N-5-methyl-2-hexyl-N'-phenyl-para-phenylenediamine in the resultant product mixture.

EXAMPLES 7 AND 8

The following Example 8 illustrates the age resister protection offered by an age resister system of the present invention.

In Example 7 a carbon black loaded (52 parts) natural rubber stock was compounded with 2.0 parts per 100 parts by weight of the natural rubber of a well known commercial antioxidant/antiozonant, N,N'-bis(1-methylheptyl)-para-phenylenediamine.

In Example 8 the same natural rubber stock was compounded with 2.0 parts per 100 parts of the natural rubber of the product of Example 1. The stocks were vulcanized for 70 minutes at 275° F. and tested for kinetic ozone resistance and kinetic sun check resistance.

The kinetic ozone tests were carried out on a $$6 \times \tfrac{1}{2} \times 0.075$$

inch test sample cut from a cured sheet. The ends of these samples were placed in metal holders and intermittently extended to 111% of their original length at a frequency of 33 cycles per minute. They were placed in an atmosphere possessing an ozone concentration of 50 parts per hundred million by volume at a temperature of 100° F. for a period of 48 hours. Both the static and kinetic ozone samples were then visually evaluated for crack formation and rated according to the rating system disclosed by J. C. Ambelang and B. W. Habeck in "Rubber World" 141, 86 (1959). The results are listed in Table III. Some of the test samples were subjected to heat aging in a forced air oven prior to testing.

Kinetic sun check data was also gathered as another method of determining the effect of weathering on the coated polymers. The kinetic sun checking tests were carried out on samples 6 inches in length and 0.075 inch thick. The samples had a V taper width of 1.1 inches at one end and 0.5 inch at the other. The wide end possessed two holes while the narrow end possessed one hole. The holes allowed the samples to be fastened to the appropriate testing apparatus.

The ends of the kinetic sun checking samples were placed in metal holders and intermittently extended 115% of their original length at a frequency of 60 cycles per minute. This assembly was weathered outdoors for 16 days.

After the weather testing was completed the kinetic sun checking samples were visually evaluated for crack formation and rated according to the rating system disclosed by J. C. Ambelang and B. W. Habeck in "Rubber World" 141 86 (1959). The data are listed in Table III. Some of the test samples were subjected to heat aging in a forced air oven prior to aging.

TABLE III

| | Example 7 | Example 8 |
|---|---|---|
| Age resister system | (¹) | (²) |
| Kinetic ozone: | | |
| Original | ³ 21½–4 | 21½–4 |
| Aged ⁴ | 4/4 | 4/1–4 |
| Kinetic sun checking: | | |
| Original | 4/7 | 4/4 |
| Aged ² | 4/7 | 4/7 |

¹ N,N'-bis(1-methylheptyl)-para-phenylene-diamine (2.0 parts).
² 50/50 MPDA/MHDA (2.0 parts).
³ The numerator value is a rating given the test samples based on the density of cracks formed during the ozone testing. As the number of cracks increased the numerator value increases. The denominator value is a rating based on the size of the cracks. This value increases as the crack size increases. A rating of 4/10 is the poorest rating under this rating system, while a rating of 0/0 is the best possible rating.
⁴ The samples were aged in a forced air oven for 48 hours at 212° F. prior to the ozone testing.

The above data reveal that an age resister system of the present invention (Example 8) offered the vulcanized natural rubber stock protection at least equal to that provided by a well known commercial antioxidant/antiozonant (Example 7).

The ability of a product of the process of the present invention to protect rubber against ozone degradation was evaluated by conducting dilute solution viscosity (DSV) tests using natural rubber (pale crepe) as the base rubber. In this test the retention of viscosity of a solvent solution of the rubber upon exposure to a mixture of oxygen and ozone which is bubbled through the solution is taken as a measure of antiozonant efficiency. The DSV tests were carried out in accordance with the general procedure outlined in the article by Delman, Simms & Allison (Analytical Chemistry, 26, 1589–1592 (1954). Essentially this procedure comprises preparing a masterbatch solution of 0.8 gram of the base rubber in 100 milliliters of an organic solvent such as carbon tetrachloride, dichlorobenzene, toluene, etc. In Examples 9 and 10, benzene was used as the solvent. Portions of the masterbatch solution are then diluted with additional solvent to obtain solutions containing 0.2 gram of rubber per 100 milliliters of solution. The inhibitors to be evaluated for antiozonant efficiency are introduced to separate portions of the above described dilute solution in the amount of four parts per 100 parts of rubber. In Example 9 a well known commercially available antioxidant/antiozonant which is a mixture of diaryl-para-phenylene-diamines was used. In Example 10, the product prepared in Example 1 was used. A stream of oxygen containing ozone is then passed through the dilute solutions and their viscosity determined at selected intervals using a Cannon-Fenski-Ostwald type viscometer.

The antiozonant efficiency of the inhibitors is calculated by employing the following equation:

$$\text{Antiozonant efficiency percent} = \frac{100(B-A)}{C-A}$$

where:

A = DSV of additive free control after ozonolysis
B = DSV of additive containing solution after ozonlysis
C = initial DSV of additive free control before ozonolysis Results are then converted to a common basis (to allow for sporadic variations in crepe rubber compositions or in experimental conditions) by relating the antiozonant efficiency of an inhibitor to that of a standard inhibitor. Therefore in the following Table IV, Example 9 was given an antiozonant efficiency value of 100.

TABLE IV

| Stabilizer | | Antiozonant Efficiency (AOE) |
|---|---|---|
| Example: | | |
| 9 | Control ¹ | 100 |
| 10 | Product of Example 1 | 164 |

¹ A well known commercially available antioxidant/antiozonant which is a mixture of diaryl-para-phenylenediamines.

The age resister used in Example 10 was quite superior to the control age resister used in Example 9.

While certain representative embodiments and details have been shown for the purpose of illustrating the invention it will be apparent to those skilled in this art that various changes and modifications may be made therein without departing from the spirit or scope of the invention.

What we claim is:

1. In the process for manufacturing an age resister system the step of reacting a mixture consisting essentially of (A) 4-methyl-2-pentanone; (B) 5-methyl-2-hexanone and (C) at least one nitrogen containing compound selected from the group consisting of p-nitro diphenylamine, p-aminodiphenylamine and p-nitroso diphenylamine in the presence of hydrogen and a reductive alkylation catalyst system at temperatures between 50° C. and 240° C. and pressures from 250 p.s.i. to 5000 p.s.i. wherein the molar ratio of (A) to (B) is from about 30/70 to about 80/20 and the molar ratio of the ketones to the nitrogen containing compound is from about 1/1 to about 10/1.

2. In the process of claim 1 wherein the molar ratio of the ketones to the nitrogen containing compound is from about 4/1 to about 5/1.

3. In the process of claim 1 wherein the reductive alkylation catalyst system includes platinum as a catalyst.

4. In the process of claim 1 wherein the reductive alkylation catalyst system includes nickel as a catalyst.

5. In the process of claim 1 wherein the nitrogen containing compound is p-aminodiphenylamine.

6. In the process of claim 1 wherein the nitrogen containing compound is p-nitro diphenylamine.

7. In the process of claim 1 wherein the ratio of component (A) to component (B) is from 60/40 to 30/70.

8. In the process for manufacturing an age resister system the step of reacting a mixture comprising (A) 4-methyl-2-pentanone; (B) 5-methyl-2-hexanone and (C) at least one nitrogen containing compound selected from the group consisting of p-nitro diphenylamine and p-aminodiphenylamine in the presence of hydrogen and a reductive alkylation catalyst system at temperatures between 50° C. and 240° C. and pressures from 250 p.s.i. to 5000 p.s.i. wherein the molar ratio of (A) to (B) is from about 70/30 to about 58/42 and wherein the molar ratio of the ketones to the nitrogen containing compound is from about 4/1 to about 5/1.

References Cited

UNITED STATES PATENTS

| 3,000,857 | 9/1961 | Merz | 260—576 |
| 3,209,030 | 9/1965 | Bicek | 260—576 |
| 3,366,684 | 1/1968 | Budd | 252—430 |
| 3,418,373 | 12/1968 | Summers et al. | 260—576 |
| 3,496,230 | 2/1970 | Kaplan | 260—576 |

FOREIGN PATENTS

| 1,035,262 | 6/1966 | Great Britain. |

LEON D. ROSDOL, Primary Examiner

I. GLUCK, Assistant Examiner

U.S. Cl. X.R.

252—182, 426; 260—576